Feb. 28, 1950  E. C. JENSEN  2,499,145
BAIT RETAINING ATTACHMENT FOR FISHHOOKS
Filed Dec. 12, 1947

Inventor

Einar C. Jensen

By Randolph & Beavers
Attorneys

Patented Feb. 28, 1950

2,499,145

UNITED STATES PATENT OFFICE 2,499,145

BAIT RETAINING ATTACHMENT FOR FISHHOOKS

Einar C. Jensen, Waterloo, Iowa

Application December 12, 1947, Serial No. 791,179

1 Claim. (Cl. 43—44.2)

This invention relates to an attachment for fishhooks and more particularly to a device adapted to be carried by a conventional fishhook and which will effectively function for retaining a piece of soft bait thereon and which is capable of being readily engaged with or disengaged from the bait, when applied to the fishhook.

Considerable difficulty is ordinarily encountered in retaining various types of soft bait such as soft crab, certain fish cuts, cheese and other baits used in fresh and salt water fishing on a fishhook and anglers frequently resort to thread or other means for tying the bait to the hook.

Accordingly, it is a primary object of the present invention to provide a means of extremely simple construction capable of being readily applied to conventional fishhooks already in use or which may be readily assembled with a fishhook for sale as a part thereof and which will effectively function for retaining a piece of soft bait applied thereto and which can be readily moved to an inoperative position for applying or removing the bait.

Still a further object of the invention is to provide an attachment of the above described character which may be economically manufactured and sold, which will be efficient for its intended purpose and which will not interfere with a fish being hooked by the hook on which the attachment is mounted.

Various other objects and advantages of the invention will hereinafter become more fully apparent from the following description of the drawing, illustrating a presently preferred embodiment thereof, and wherein.

Figure 1:
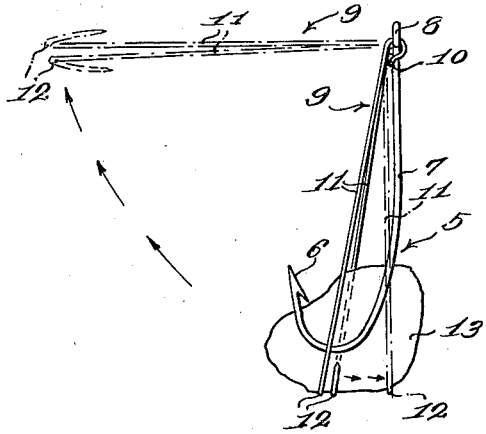
Figure 1 is a side elevational view showing the invention in an operative position in full line and in an inoperative position in dotted line.

Referring more specifically to the drawing, the invention includes a conventional fishhook 5 having an upturned barbed end 6 and an elongated shank 7 which terminates at its free or upper end in a fish line engaging eye 8 which is disposed substantially transversely to the plane of the hook 5 or to the direction from which the barbed end of the hook extends from the shank thereof.

The novel bait retaining attachment, designated generally 9 and comprising the invention, comprises a single strand of a relatively resilient material such as wire the intermediate portion 10 of which is looped around the forward part of the hook shank 7, below and adjacent the eye 8 and the ends of which are passed forwardly through the eye 8 for securely connecting the intermediate portion of the strand to the eye of the hook. The corresponding ends of the resilient strand forming the bait retainer 9 form corresponding resilient legs 11 which extend downwardly and outwardly with respect to one another from the eye 8 and which terminate in inwardly and upwardly turned corresponding arcuate terminal portions 12 which, in their normal positions, as illustrated in full lines in Figure 3, partially overlap one another and extend under the upturned portion of the hook 5. The arcuate portions 12 are normally held in their full line positions of Figure 3 by the natural resiliency of the strand forming the retainer 9 but are capable of being spread relatively to one another, as illustrated in dotted lines in Figure 3. It will likewise be readily apparent that the connection of the intermediate portion of the retainer strand to the shank 7 and eye 8 will permit said retainer 9 to be swung on the eye 8 as a pivot outwardly and upwardly from its full line position of Figure 1 to the dotted line position, substantially at right angles thereto or said portions 11 and 12 may be yieldably moved in the opposite direction or toward the shank 7 and into the other dotted line position of Figure 1.

Figure 2:
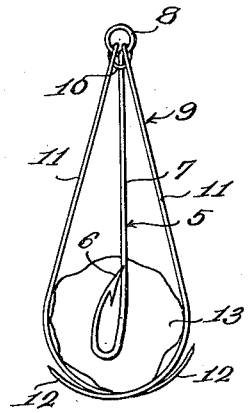
Figure 2 is a front elevational view thereof looking from left to right of Figure 1.
Figure 3:
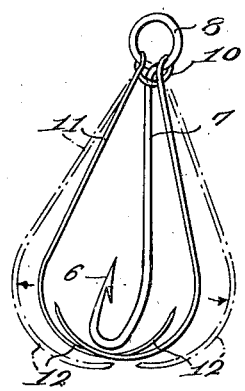
Figure 3 is a perspective view showing the invention with the bait removed from the hook and illustrating the attachment in dotted lines in a spread position.

From the foregoing it will be readily apparent that a piece of any suitable soft bait, as indicated at 13, can be readily applied to the barbed end 6 of the hook 5 when the retainer 9 is in its uppermost, dotted line position of Figure 1 after which said retainer 9 can be swung downwardly and to the right of Figure 1 and the legs 11 thereof spread, as illustrated in Figure 3 for engaging the inturned arcuate terminals 12 around the under part of the bait and below the crook of the hook 5 for co-operation therewith in retaining the bait 13 in engagement with the hook. If desired, the retainer 9 can be yieldably swung to its extreme right dotted line position of Figure 1 and thus engaged with the bait 13 for more effectively retaining the bait on the hook and in said last mentioned position the portions 11 and 12 will yieldably bear on the bait and press upwardly and to the left thereon with respect to the hook 5 and as illustrated in Figure 1 whereas in the position of the retainer 9 in its full line illustration of Figure 1 and as illustrated in Figure 2, the bait 13 will be pressed inwardly between the leg portions 11 and toward the hook 5 and upwardly and toward the hook 5 by the arcuate terminal portions 12. The bait 13 may also be applied with the legs 11 spread as illustrated in dotted lines in Figure 3 or the bait may be removed from the hook when the legs 11 are in their dotted line positions of Figure 3.

Various modifications and changes are contemplated and may obviously be resorted to, without departing from the spirit or scope of the invention as hereinafter defined by the appended claim.

I claim as my invention:

A fishhook provided with a shank having a line engaging eye at one end and a hook at the opposite end in combination with a bait retainer comprising a single strand of resilient material, said strand having hook formations at the free ends thereof and a loop at an intermediate portion of the strand, said loop having eyes at the ends thereof, said eyes being pivotally mounted on the eye of the hook and said loop being in contacting relation with the shank of the hook, the free ends of the strand being normally in overlapping relation and adapted to embrace a bait attached to the hook.

EINAR C. JENSEN.

REFERENCES CITED

The following references are of record in the file of this patent:

UNITED STATES PATENTS

| Number | Name | Date |
| --- | --- | --- |
| 740,416 | Gebhardt | Oct. 6, 1903 |
| 1,464,571 | Hanson | Aug. 14, 1923 |
| 1,863,544 | Prouse | June 14, 1932 |
| 2,319,246 | Martin | May 18, 1943 |